United States Patent [19]

Layfield

[11] Patent Number: 5,238,310
[45] Date of Patent: Aug. 24, 1993

[54] BEARING ASSEMBLIES

[75] Inventor: Jonathon M. H. Layfield, Cranfield, England

[73] Assignee: Rubery-Owen Rockwell Limited, Wednesbury, United Kingdom

[21] Appl. No.: 917,113

[22] PCT Filed: Dec. 5, 1990

[86] PCT No.: PCT/GB90/01896
§ 371 Date: Aug. 6, 1992
§ 102(e) Date: Aug. 6, 1992

[87] PCT Pub. No.: WO91/09231
PCT Pub. Date: Jun. 27, 1991

[30] Foreign Application Priority Data

Dec. 7, 1989 [GB] United Kingdom ............... 8927639

[51] Int. Cl.⁵ ............................................. F16C 23/04
[52] U.S. Cl. .................................. 384/145; 384/209; 384/903
[58] Field of Search ............... 384/145, 152, 209, 903, 384/213, 206, 203, 204, 192, 207, 211, 208

[56] References Cited

U.S. PATENT DOCUMENTS

| | | | |
|---|---|---|---|
| 3,627,389 | 12/1971 | Foote | 384/208 |
| 4,105,261 | 8/1978 | Myers et al. | 384/208 |
| 4,498,799 | 2/1985 | Wartelle et al. | 384/209 |
| 4,647,230 | 3/1987 | Friedrich et al. | 384/903 |

Primary Examiner—Lenard A. Footland
Attorney, Agent, or Firm—Spensley Horn Jubas & Lubitz

[57] ABSTRACT

There is provided in combination a shaft and a bearing assembly on the shaft comprising a bush having a cylindrical bore in which the shaft is received and a part-spherical outer periphery, and opposed housing members secured, or adapted to be secured, together having inner surfaces shaped to co-operate with the outer periphery of the bush so as to hold and locate the bush whilst allowing tilting of the bush within the assembled housing members, at least one of the housing members being formed to provide for axial and radial location of the assembly on or in a mounting therefor, characterized in that the shaft has a peripheral annulus, the bush has an annulus in its bore and a locating member is engaged with the two annuli and thereby locates the shaft axially in the bearing assembly.

17 Claims, 3 Drawing Sheets

BEARING ASSEMBLIES

This invention relates to bearing assemblies and their location on shafts and, more particularly, though not exclusively, to a bearing assembly located on a brake actuating shaft for a vehicle axle.

An axle, for example for a trailer vehicle, comprises an axle beam having a hub at each end. The hubs are rotatably mounted on bearings and, adjacent to each hub, there is a brake assembly. Each brake assembly comprises a brake anchor bracket secured to the axle beam, as by welding or bolting, and carrying two opposed brake shoes which are pivotally mounted at one end on anchor pins and at the other end bear on a brake actuating mechanism. The brake actuating mechanism comprises a shaft (the camshaft) having a cam on its outboard end and which is spaced from and lies parallel to the axle beam, rotatably mounted in an outboard bearing assembly at the anchor bracket and in an inboard bearing assembly adjacent to the inboard end of the camshaft. The inboard bearing assembly is mounted on the axle beam. One end of a lever is fitted to the camshaft at its inboard end and the other end of the lever is connected to a brake actuator, operated, for example, by compressed air, to rotate the camshaft to cause the brake shoes to be expanded to engage a brake drum carried by the hub. (Expansion of the brake shoes is effected by the cam, for example an S-cam, on the outboard end of the camshaft which acts on the other ends of the brake shoes via rollers mounted thereon.

This invention aims in a first aspect to provide a combination of a shaft and a bearing assembly which, inter alia, may be the combination of a camshaft on an axle such as has been described and an outboard bearing on the camshaft.

According to the first aspect of the present invention there is provided in combination a shaft and a bearing assembly on the shaft comprising a bush having a cylindrical bore in which the shaft is received and a part-spherical outer periphery, and opposed housing members secured, or adapted to be secured, together having inner surfaces shaped to co-operate with the outer periphery of the bush so as to hold and locate the bush whilst allowing tilting of the bush within the assembled housing members, at least one of the housing members being formed to provide for axial and radial location of the assembly on or in a mounting therefor, characterised in that the shaft has a peripheral annulus, the bush has an annulus in its bore and a locating member is engaged with the two annuli and thereby locates the shaft axially in the bearing assembly.

The locating member may be a snap ring or spring clip to facilitate assembly of the shaft in the bearing assembly and removal therefrom.

In applications in which the bearing assembly is required to react a radial force applied to the shaft (such as is the case when the shaft is an S-cam brake shaft) it may be beneficial to provide for the radial location of the bearing assembly by one or more, preferably three equi-spaced, protrusions on one of the housing members adapted to locate radially against a surface or surfaces of the mounting for the assembly radially spaced from the central axis of the cylindrical bore, such that a proportion of the radial force is transmitted to the mounting through the protrusion, or one of the protrusions.

According to a second aspect of the present invention there is provided a bearing assembly adapted to be used in the combination in accordance with the first aspect of the invention as herein set forth, comprising a bush having a part-spherical outer periphery and a cylindrical bore adapted to receive a shaft of complementary diameter, and opposed housing members secured, or adapted to be secured, together having inner surfaces shaped to co-operate with the outer periphery of the bush so as to hold and locate the bush whilst allowing tilting of the bush within the assembled housing members, at least one of the housing members being formed to provide for axial and radial location of the bearing assembly on or in a mounting therefor, characterised in that the bush has an annulus in the form of a groove in, and disposed centrally of the length of, the bore and a locating member in the form of a snap ring or spring clip is engaged in the annulus and protrudes into the bore so as to be able to engage in an annular groove in a shaft which the bore is adapted to receive and thereby locate the shaft axially in the bearing assembly.

BRIEF DESCRIPTION OF THE DRAWINGS

One embodiment of the invention will now be described by way of example with reference to the accompanying drawings in which:

Referring to FIGS. 1 and 2 of the drawings, a bearing assembly 1 includes two housing members which are shown as similar steel pressings 2, 3. The pressings each have an outer flange portion 4 with registering holes 5 whereby the assembly 1 can be secured, for example by bolts or like fastenings, to a mounting which is here shown (in part only) in FIG. 2 as a brake anchor bracket 6. Inboard from the flange portions 4 the pressings 2, 3 have an axially extending portion which includes three equi-spaced protrusions 7 joined by and alternating with three part-spherical portions 8. The protrusions 7 and portions 8 merge to extend axially a short distance and then radially inwardly to provide housings for O-ring seals 9.

Figure 2:
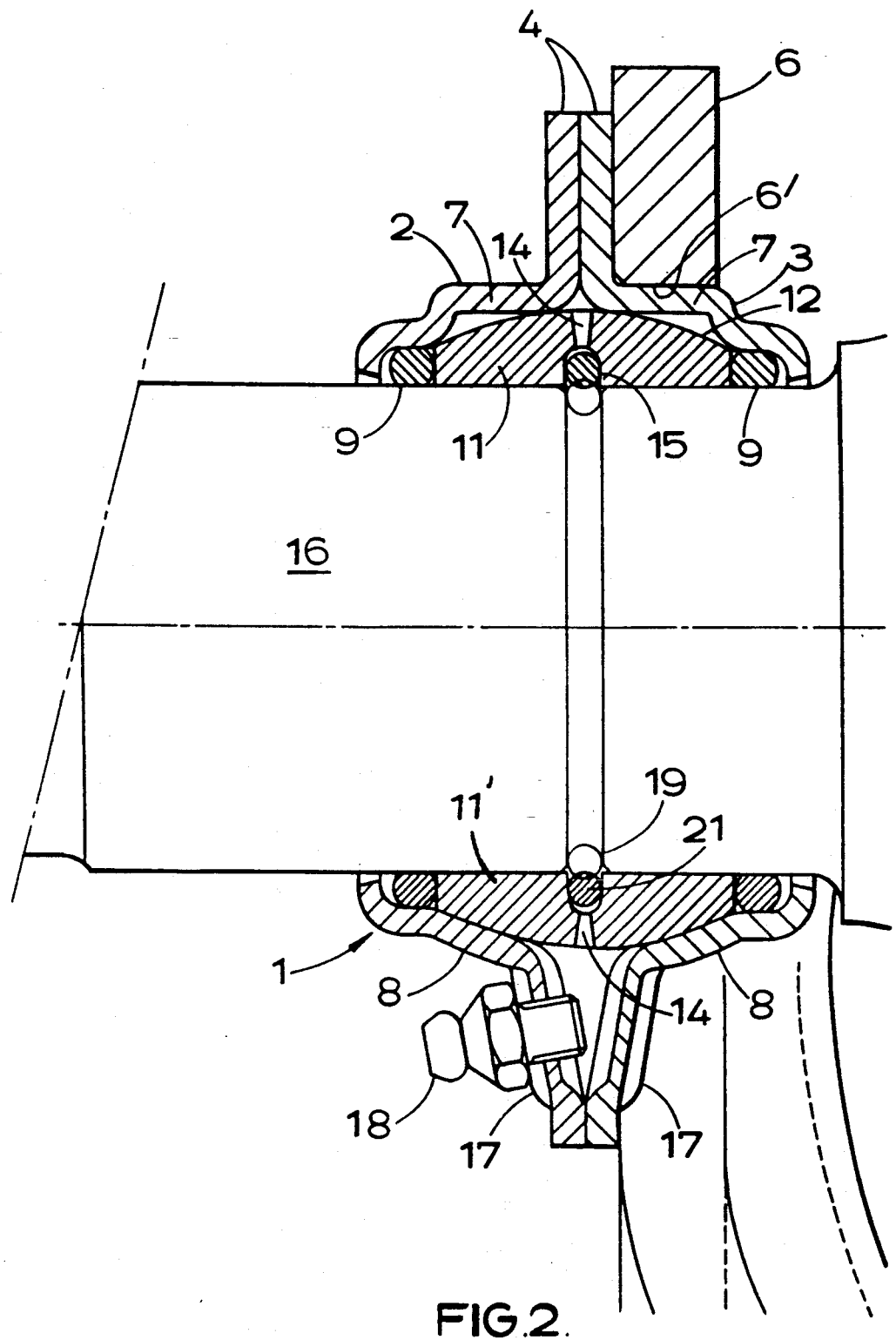
FIG. 2 is a side elevation of the bearing assembly and shaft of FIG. 1, showing the bearing assembly in section.

A bearing bush 11 has a cylindrical bore 11' and a part-spherical outer periphery 12 which co-operates with the complementary part-spherical portions 8 of the pressings 2, 3 which provide axial and radial location, and support, for the bush. The bush 11 has centrally located radial lubrication passages 14, provided as drillings, extending from its outer periphery 12 into a central annulus 15, which is in the form of a groove as seen in FIG. 2. A shaft 16 is received in the bush 11.

The pressings 2, 3 each incorporate a small platform 17. The platform 17 of pressing 2 is drilled and tapped to receive a grease nipple 18 for injection of grease to lubricate the co-operating surfaces of the part-spherical portions 8 of the pressings and the outer periphery 12 of the bush 11 and, via the lubrication passages 14 and annulus 15, the co-operating surfaces of the bush 11 and shaft 16.

Figure 3:
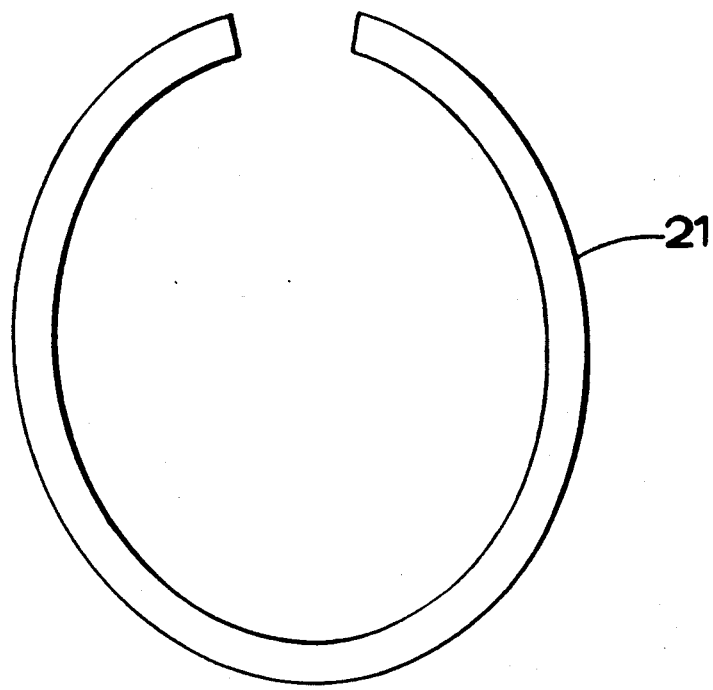
FIG. 3 is a front elevation of a snap ring.
Figure 4:
FIG. 4 is a plan view of the snap ring of FIG. 3.

The shaft 16 also has an annulus 19 in the form of a groove (shown as being of U-shaped cross-section but it may for example be of V-shaped cross-section) and a snap ring 21 is engaged in the annuli 15, 19 to locate the shaft 16 in the bearing assembly 1. As seen in FIGS. 3 and 4 the snap ring 21 is generally oval in shape and, FIG. 2, of circular cross-section, and provides a satisfactory location for the shaft 16. The application of a blow with a hammer to the end of the shaft is sufficient to release the snap ring 21 from the annulus 19 and allow removal of the shaft 16.

Figure 1:
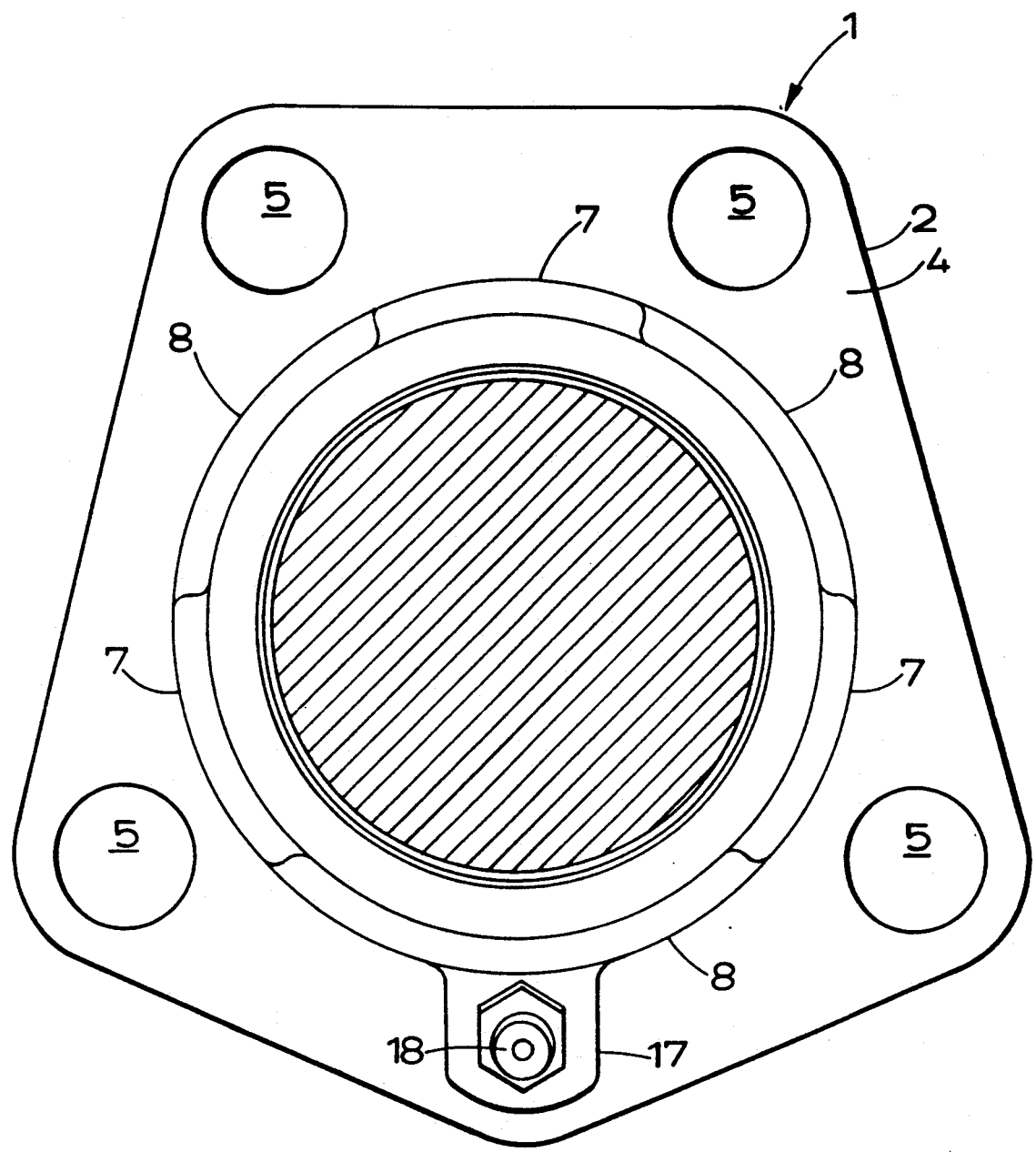
FIG. 1 is a front elevation of a bearing assembly and a shaft, the latter being shown in section.

In an S-cam brake, rotation of the shaft 16 to expand the brake shoes against the brake drum gives rise to a bending force on the shaft, applied at the cam. Preferably the bearing assembly and its mounting are arranged so that a proportion of this bending force is reacted by the mounting through one of the protrusions 7. An axle such as has been described will have an S-cam brake at each end, one having a left hand cam and the other a right hard cam. Considering the bearing assembly as shown in FIGS. 1 and 2, the three equi-spaced protrusions 7 of the pressing 3 adjacent to the anchor bracket 6 locate in and abut radially against the peripheral wall surface 6' of an opening in the anchor bracket through which the shaft 16 extends. When a bending force is exerted on the shaft at the cams a proportion of the bending force for the right hand camshaft will be reacted at the relevant bearing assembly by one of the three protrusions 7 of the one pressing 3 at the appropriate location bearing radially on the respective anchor bracket at the peripheral wall surface 6' of the opening, and a proportion of the bending force for the left hand camshaft will be reacted at the relevant bearing assembly by a protrusion 7 of its one pressing bearing radially at another of the locations on the anchor bracket with which that bearing assembly is associated.

The protrusions 7 centralise and radially locate the bearing assembly in the anchor bracket 6. Also, the flanges 4 locate the bearing assembly axially with respect to the anchor bracket 6.

For transport purposes the bearing assembly may be made by staking the pressings 2, 3, and the assembly is secured for use by bolting to a mounting.

The bush 11 may conveniently be made of sintered metal or of a plastics material. The housing members have been described as metal pressings. However, these also could be of sintered metal or of a plastics material. In the latter case the part-spherical housing for the bush, whether of sintered metal or of plastics material, may be continuous instead of the interrupted design provided by the spaced part-spherical portions 8 of the pressed members which have been described. Similarly, the protrusions 7 may be continuous instead of being interrupted.

Figure 5:
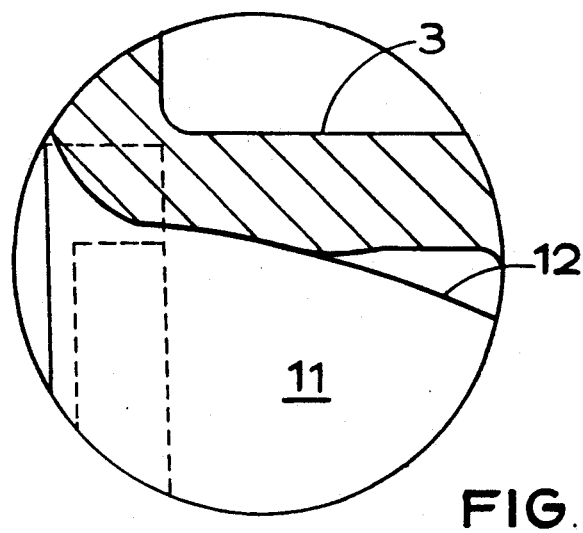
FIG. 5 is a scrap view in enlarged detail of part of FIG. 2 showing a bearing surface of a housing member which co-operates with a bush of the bearing assembly.

FIG. 5 is a scrap view on an enlarged scale showing a part-spherical bearing surface of the pressing 3 which co-operates with the outer periphery 12 of the bush 11, as seen at the top right of FIG. 2.

I claim:

1. In combination a shaft (16) and a bearing assembly (1) on the shaft comprising a bush (11) having a cylindrical bore (11') in which the shaft is received and a part-spherical outer periphery (12), and opposed housing members (2,3) adapted to be together having inner surfaces shaped to co-operate with the outer periphery of the bush so as to hold and locate the bush whilst allowing tilting of the bush within the assembled housing members, at least one of the housing members being formed to provide for axial and radial location of the bearing assembly on or in a mounting therefor, characterised in that the shaft (16) has a peripheral annulus (19), the bush (11) has an annulus (15) in its bore (11') and a locating member (21) is engaged with the two annuli (19,15) and thereby locates the shaft axially in the bearing assembly (1).

2. The combination according to claim 1 characterised in that the annulus (15) of the bush (11) is disposed centrally of the length of the bore (11').

3. The combination according to claim 1 characterised in that the annuli (19,15) of the shaft (16) and bush (11) are grooves into which the locating member (21) is received.

4. The combination according to claim 3 characterised in that the locating member (21) is in the form of a snap ring or spring clip.

5. The combination according to claim 3 characterised in that the locating member (21) is in the form of a snap ring of circular cross-section and generally oval in shape.

6. The combination according to any of claim 3 characterised in that the bush (11) has lubrication passages (14) extending from its part-spherical outer periphery into the annulus (15) of the bush.

7. The combination according to claim 1 characterised in that the housing members (2,3) each have an outer flange portion (4) at which they are secured, or adapted to be secured, together, and at which they are adapted to be secured to a mounting for the bearing assembly (1) to locate the bearing assembly axially and radially on or in the mounting.

8. The combination according to claim 7 characterised in that the outer flange portions (4) of the housing members (2,3) have registering holes (5) whereby the housing members are secured together, and can be secured to the mounting, by means of bolts or like fastenings.

9. The combination according to claim 1 characterised in that the housing members (2,3) each have an axially extending portion including one or more part-spherical portions (8) complementary to, and providing the inner surfaces which co-operate with, the outer periphery of the bush (11).

10. The combination according to claim 9 characterised in that each housing member (2,3) has three said part-spherical portions (8) equi-spaced apart.

11. The combination according to claim 1 characterised in that at least the said one housing member (2,3) formed to provide for axial and radial location of the bearing assembly (1) on or in a mounting, has one or more protrusions (7) adapted to locate radially against a surface or surfaces of the mounting radially spaced from the central axis of the bore (11'), the arrangement being such that in use of the combination a radial force applied to the shaft (16) is reacted by the bearing assembly by a proportion of the radial force being transmitted to the mounting through the protrusion (7), or one of the protrusions (7).

12. The combination according to claim 11 characterised in that there are three said protrusions (7) equi-spaced around the central axis of the bore (11').

13. The combination according to claim 12 characterised in that the housing member (2, 3) each have an axially extending portion including three part-spherical portions (8) equi-spaced apart and complementary to, providing the inner surfaces which cooperate with, the outer periphery of the bush (11), and the three part-spherical portions (8) are disposed between the three equi-spaced protrusions (7) such that the part-spherical portions and protrusions alternate sound around the central axis of the bore (11').

14. The combination according to any preceding claim characterised in that the housing members (2,3) have portions shaped to provide housings adjacent to opposite ends of the bore (11') and O-ring seals (9) are applied to the shaft (16) at opposite ends of the bore and received in said housings.

15. The combination according to claim 1 characterised in that one said housing member (2) has a platform (17) on which is received and located a grease nipple (18) for injection of grease to lubricate the outer periphery of the bush (11) and co-operating inner surfaces of the housing members (2,3).

16. The combination according to claim 1 characterised in that the shaft is an S-cam brake shaft.

17. A bearing assembly comprising a bush (11) having a part-spherical outer periphery (12) and a cylindrical bore (11') adapted to receive a shaft of complementary diameter, and opposed housing members (2,3) adapted to be secured together having inner surfaces shaped to co-operate with the outer periphery of the bush so as to hold and locate the bush whilst allowing tilting of the bush within the assembled housing members, at least one of the housing members being formed to provide for axial and radial location of the bearing assembly on or in a mounting therefor, characterised in that the bush (11) has an annulus (15) in the form of a groove in, and disposed centrally of the length of, the bore (11') and a locating member (21) in the form of a snap ring or spring clip is engaged in the annulus and protrudes the bore (11') so as to be able to engage in an annular groove in a shaft which the bore is adapted to receive and thereby locate the shaft axially in the bearing assembly.

* * * * *